3,441,593
METHOD FOR PRODUCING FUMARONITRILE AND/OR MALEONITRILE

Naoto Hashimoto, Suita, and Katsura Morita, Ikeda, Japan, assignors to Takeda Chemical Industries, Ltd., Osaka, Japan
No Drawing. Filed Mar. 14, 1967, Ser. No. 622,891
Claims priority, application Japan, Mar. 15, 1966, 41/16,232
Int. Cl. C07c *121/28*
U.S. Cl. 260—465.8     8 Claims

ABSTRACT OF THE DISCLOSURE

A method for the production of fumaronitrile and/or maleonitrile comprises reacting acetonitrile with halogen in the vapor phase in a molar ratio of less than one mol of halogen per mol of acetonitrile.

---

This invention relates to a novel and improved method for the production of fumaronitrile and/or maleonitrile. More particularly, this invention relates to a method for the production of fumaronitrile and/or maleonitrile, which comprises reacting acetonitrile with halogen in the vapor phase in a molar ratio of less than one mol of halogen per mol of acetonitrile.

Acetonitrile and fumaronitrile are widely employed as industrial raw materials for the production of a number of chemical compounds. Hitherto, there have been known the following methods for the production of fumaronitrile:

(a) Fumaric acid is converted to fumaramide via its diethyl ester, and subsequently the amide is subjected to dehydration with phosphorus pentoxide (Organic syntheses 30, 46);

(b) Trans-diiodoethylene produced from acetylene and iodine is reacted with cuprous cyanide (Recueil des Travaux Chimiques des Pays-Bas 65, 823);

(c) α-Chloroacrylonitrile is reacted with a water-soluble cyanide in its aqueous solution at pH 7 to 9 (U.S. Pat. No. 2,471,767).

Maleonitrile has heretofore been prepared by the isomerization reaction of fumaronitrile with hydrochloric acid.

However, these known methods are not satisfactory at all for the production of fumaronitrile on an industrial scale, because, for example, the production of fumaronitrile according to method (a) requires many complex process steps, while according to methods (b) and (c), the yield of fumaronitrile is very low.

It is an object of this invention to provide a novel and industrially feasible method for producing fumaronitrile and/or maleonitrile in good yield by a simple one-step reaction.

This object is achieved according to the present invention by subjecting acetonitrile and halogen to vapor phase reaction in a molar ratio of less than one mol of halogen per mol of acetonitrile. In this way, maleonitrile and/or fumaronitrile are easily obtained in good yield in one step from simple starting materials, and therefore, the present method is advantageously feasible for the production of the objective compounds on a commercial scale.

As the halogen, there is used chlorine, bromine, iodine, etc. The use of chlorine or bromine, in particular, results in a good yield of the objective product.

The molar ratio of halogen relative to acetonitrile should be less than 1. It is preferable to employ the halogen in the range of 0.05 to 0.8 mol and especially 0.1 to 0.5 mol per mol of acetonitrile.

The reaction is carried out by contacting the acetonitrile and the halogen in the vapor phase. It can be carried out by passing a mixture of acetonitrile and halogen through a reactor, e.g. a tubular reactor.

The tubular reactor advantageously takes the form of an elongated quartz tube, the length of which is a multiple of its diameter (for example, the tube may be 50 cm. in length with an inner diameter of 1.3 cm.). Vertical disposition of the tubular reactor is optimal, although the reactor may have a substantial inclination. A plurality of tubular reactors may also be employed. Alternatively, the reaction can be carried out by first mixing gaseous acetonitrile and halogen and then heating the mixture to a reaction temperature for the vapor phase reaction. If desired, the reactant gases can be passed through a series of reaction zones previously heated up to the reaction temperature. The limit of reaction temperature varies with the reaction pressure, kind of halogen, molar ratio of starting materials and so on, but in general it is in the range of 300 to 1200° C., and preferably from 500 to 1000° C.

The reaction pressure employed can be a reduced, atmospheric or superatmospheric pressure, but operation at a reduced pressure of 10 to 100 mm. Hg is preferable. The reaction period varies with reaction temperature, pressure, etc.

In the present method, a catalyst may be used, if desired.

Inert gas such as nitrogen, carbon dioxide and the like can be present in the reaction system, if desired. The amount of inert gas is determined by practical considerations.

The separation of fumaronitrile and maleonitrile, if desired, is carried out in a manner which is per se conventional in vapor phase reactions, for example, by fractional distillation under reduced pressure, etc.

Generally, in the method of the present invention, fumaronitrile is produced in a larger amount than maleonitrile. However, if desired, it is possible to produce maleonitrile in a larger amount than fumaronitrile by changing such reaction conditions as the reaction temperature, reaction catalyst, and kind of halogen.

The following examples show presently preferred embodiments of this invention, but are not intended to be restrictive thereof. In the examples, the abbreviations cm., mm. and g. represent centimeter(s), millimeter(s) and gram(s), respectively.

EXAMPLE 1

A vertically disposed, elongated tubular reactor made of quartz is heated by two electric heaters which are arranged about the reactor to heat the upper and lower portions thereof, respectively. The upper heater temperature is such that the starting materials passing through the upper portion of the reactor are heated to a temperature of about 400° C. The lower heater effectively encompasses the main reaction zone of the reactor and maintains the temperature in said zone at about 800° C. under a pressure of about 70 mm. Hg. Acetonitrile which is vaporized by heating in a pre-heater and chlorine gas are respectively fed to the reactor simultaneously through different inlets at the upper portion of the reactor at a rate of 10 g. and 7 g. per hour, respectively. The effluent gaseous reaction mixture from the reactor is collected in a receiver which is previously cooled with Dry Ice-acetone. At the end of each one-hour run, the thus-obtained liquid reaction mixture is subjected to distillation under reduced pressure, whereby 2.0 g. of fumaronitrile and 0.8 g. of maleonitrile, having a melting point at 98° C. and 32° C., respectively are obtained. The yield of fumaronitrile plus maleonitrile is about 72% calculated on the basis of acetonitrile actually consumed. The products thus obtained show the infrared absorption spectrum, ultraviolet absorption spectrum and nuclear magnetic resonance spectrum identical with those of fumaronitrile and maleonitrile.

EXAMPLE 2

10 grams of gaseous acetonitrile which has been vaporized by heating in a pre-heater, and 3.5 g. of chlorine gas are charged in 50 minutes together with helium gas stream at a rate of 50 ml. per minute into the same reactor as in Example 1, wherein the reaction zone is maintained at about 800° C., to allow the reaction to take place, while constantly controlling the pressure in the reactor at about 760 mm. Hg. The reaction mixture is treated in the same way as in Example 1, whereby 1.11 g. of fumaronitrile and 0.63 g. of maleonitrile are produced.

EXAMPLE 3

Reaction is carried out in the same way as in Example 1 by employing 10 g. of vaporized acetonitrile and 16 g. of gaseous bromine at about 800° C. under a pressure of 50 mm. Hg in the reaction zone, whereby 1.55 g. of fumaronitrile and 0.32 g. of maleonitrile are produced.

Having thus disclosed this invention, what is claimed is:

1. A method for producing at least one of fumaronitrile and maleonitrile, which comprises heating to about 300–1200° C., a mixture of acetonitrile and elemental halogen selected from the group consisting of Cl, Br and I in the vapor phase in a ratio of less than one mol of haolgen per mol of acetonitrile.

2. The method claimed in claim 1, wherein the molar ratio of halogen relative to acetonitrile is within the range of from 0.05 to 0.8:1.

3. The method claimed in claim 1, wherein the molar ratio of halogen relative to acetonitrile is within the range of from 0.1 to 0.5:1.

4. The method claimed in claim 1, wherein said halogen is chlorine.

5. The method claimed in claim 1, wherein said halogen is bromine.

6. The method claimed in claim 1, wherein the reaction is carried out at about 500 to 1000° C.

7. The method claimed in claim 1, wherein the reaction is carried out at atmospheric pressure.

8. The method claimed in claim 1, wherein the reaction is carried out under reduced pressure.

References Cited

FOREIGN PATENTS 742,729   7/1966   Canada.

JOSEPH P. BRUST, *Primary Examiner.*